(12) United States Patent
Dupré

(10) Patent No.: US 7,023,994 B1
(45) Date of Patent: Apr. 4, 2006

(54) METHOD AND DEVICE FOR CUSTOMER PERSONALIZATION OF GSM CHIPS

(75) Inventor: Michael Dupré, Sankt Augustin (DE)

(73) Assignee: T-Mobile Deutschland GmbH, Bonn (DE)

( * ) Notice: Subject to any disclaimer, the term of this patent is extended or adjusted under 35 U.S.C. 154(b) by 0 days.

(21) Appl. No.: 09/485,352

(22) PCT Filed: Jul. 13, 1998

(86) PCT No.: PCT/DE98/01943

§ 371 (c)(1),
(2), (4) Date: Mar. 13, 2000

(87) PCT Pub. No.: WO99/08466

PCT Pub. Date: Feb. 18, 1999

(30) Foreign Application Priority Data

Aug. 4, 1997 (DE) ............................... 197 33 662

(51) Int. Cl.
*H04L 9/08* (2006.01)
(52) U.S. Cl. .................................................. 380/247
(58) Field of Classification Search .............. 380/2–30, 380/247
See application file for complete search history.

(56) References Cited

U.S. PATENT DOCUMENTS

| | | | |
|---|---|---|---|
| 5,557,679 A | * | 9/1996 | Julin et al. .................. 380/249 |
| 5,661,806 A | * | 8/1997 | Nevoux et al. ............. 380/247 |
| 5,793,866 A | * | 8/1998 | Brown et al. .................. 380/2 |
| 5,799,086 A | * | 8/1998 | Sudia .......................... 705/76 |
| 5,883,960 A | * | 3/1999 | Maruyama et al. ......... 380/249 |
| 6,188,899 B1 | * | 2/2001 | Chatterjee et al. ....... 455/435.1 |

FOREIGN PATENT DOCUMENTS

| | | |
|---|---|---|
| DE | 195 27 715 | 7/1995 |
| EP | 0 481 714 | 4/1992 |
| EP | 0 562 890 | 8/1993 |
| EP | 0 820 206 | 7/1996 |
| WO | WO 93/07697 | 4/1993 |
| WO | WO 97/14258 | 4/1997 |

* cited by examiner

*Primary Examiner*—Gregory A. Morse
*Assistant Examiner*—Ellen C. Tran
(74) *Attorney, Agent, or Firm*—Norris McLaughlin & Marcus PA; Christa Hildebrand

(57) ABSTRACT

The invention relates to a method for personalization of GSM chips. At least one subscriber identification character (TMSI) and a card number (ICCID) are stored in the memory area of said chips in addition to a secret key (KI) and other optional data for personalization purposes. The invention aims to eliminate an unnecessarily high degree of complexity linked to management of all card data in an authentication centre (AC) and to preserve secret chip data in a more secure manner. According to the invention, final data is only written on the chip when the subscriber logs into a subscriber network. One advantage is that only initial data is written into the card enabling the customer to contact the computer centre of the information provider. During first contact the final data is traded between the card and the computer centre and written into the card. The computer centre is simply required to manage cards which have really been issued to customers.

13 Claims, 3 Drawing Sheets

METHOD AND DEVICE FOR CUSTOMER PERSONALIZATION OF GSM CHIPS

BACKGROUND OF THE INVENTION

1. Field of the Invention

A method is proposed for customer personalization of GSM chips which assumes that the chip at the time of the personalization is located in the terminal equipment of the customer.

According to the present state of the art, the network operators presently implement the GSM chip in a GSM card which is inserted in the terminal equipment. The chip may also be permanently integrated in the terminal equipment, for example, on a plug-in card of a computer. It is not important for the present method if a GSM card or a terminal with an integrated chip is employed. A "chip" in the broadest sense is understood to be an EPROM, an EEPROM, as well as an "intelligent" microprocessor.

Regardless of a particular embodiment, the following discussion will use the term "chip" and "chip manufacturer."

With centralized personalization used until now, the chip receives, aside from other data, a card number (ICCID), a subscriber identification number (IMSI) as well as several secret numbers. While the chip manufacturer can easily apply the data ICCID and IMSI to the chip, the network operator likes to keep control over the secret numbers, in particular over the key Ki, which should be known only to the card and the network.

With the present centralized personalization, the network operator receives from the card manufacturer unmarked cards and subsequently writes the final secret key.

Accordingly, this key is only known to two localities, namely the chip itself and the network operator.

Disadvantageously, an extraordinarily large static load is produced in the computer center of the network operator. A generator generates a large number of keys which are then applied to the respective cards. The key generated for each card is then simultaneously transmitted to the computer center (authentication center AC), whereafter the card is issued to the sales organization. The AC therefore has already stored all subscriber identification numbers IMSI and the associated secret keys Ki at the time the respective card is issued and has to administer these identification numbers and keys, although the respective card has not yet been sold and is still in the possession of the vendor. Consequently, cards which have not yet been sold are stored in large numbers of sales offices, while the data of these cards have to be administered by the AC.

In addition, it may happen that when a manufacturer or another member of the sales organization attempts to personalize the cards, the key may have already be compromised. The initial personalization of the chip is therefore not secure and may be subject to misuse.

2. Description of the Related Art

EP-A-562 890 discloses a mobile communication network having the capability for remotely updating a so-called subscriber identification module (SIM) in mobile stations. The SIM stores data for controlling the mobile stations and for access to the services of the mobile radio network. The data stored in the SIM can be changed, i.e., updated, over the radio air interface. However, a method for personalizing a SIM over the air interface is not described.

WO-A-97/14258 also describes a method and a device for programming a mobile station via an air interface. Optionally, programs stored in the mobile station are here replaced or additional data are transmitted via the air interface. The method described herein also permits an initial activation of the mobile station via the air interface, but not a personalization of a subscriber identification module.

WO-A-93/07697 relates to a method for personalizing an active so-called SIM card. The SIM card is here completely personalized in an authorized terminal equipment which is connected via an encrypted communication line with a the central computer of the mobile radio network. However, a personalization of the chip card when the subscriber first logs on to the mobile radio network, is also neither taught nor suggested by this reference.

It is therefore an object of the invention to improve a method, a device and a chip of the aforedescribed type so that the overly complex administration in the AC can be simplified and the secret data of the chip can be stored more securely.

To solve the object, the invention is characterized by the technical teachings of claim 1. A chip according to the invention is characterized by the technical teachings of claim 6.

SUMMARY OF THE INVENTION

To solve the object, the invention propose that the personalization of the chip is performed when the subscriber logs on to the subscriber network for the first time, wherein the following process steps are carried out in that in a first process step, the chip manufacturer obtains the ICCID and the IMSI from a number pool, the chip itself derives an initial key Ki_1 from a key K1 which is known to and entered into the chip by the chip manufacturer, while PIN and PUK are set to a default value, in a second process step, an entry is made in the authentication center (AC) and the home location register (HLR) as soon as a subscriber has entered into a contract with the network operator, in a third process step, the authentication center (AC) also derives the initial first key Ki_1, in a fourth process step, the network sets the conditions so that during logon to the network, a connection is established from the chip to the security center of the network operator (SC), in a fifth process step, the connection is routed from the chip to the SC during the first logon, in a sixth process step, a new second secret key Ki_2 and, optionally, a PUK is negotiated with the chip or generated in the security center (SC) and transmitted to the chip, in a seventh process step, the conditions of the fourth process step are disabled again.

Further, a chip is provided wherein in the memory range of the chip there are stored at least one subscriber identification number IMSI and a card number ICCID as well as for the purpose of personalization an additional secret key Ki and, optionally, additional data, wherein for pre-personalizing the chip there are further stored initial card-related data, namely a first secret key Ki_1 and, optionally, additional data, such as PIN and PUK, characterized in that the chip in the terminal equipment is Toolkit-enabled and includes means for communicating with a security center (SC) and negotiating a key.

The technical teachings according to the invention attains the following advantages: Elimination of a central personalization at the network operator; Issuance of a large number of GSM chips without producing a static load at the network operator; Reuse of "used" GSM chips; Regular change of the secret key Ki while used by the customer.

With the proposed method, the device manufacturer/chip manufacturer applies initial data associated with the card to the chip, which could be referred to as pre-personalization. The network operator himself performs the actual personalization at a later time and only for those customers who enter into a contract with the network operator.

The pre-personalization does not yet produce a static load at the network operator. The method therefore makes it possible to distribute "millions" of GSM chips, for example in each and every automobile, in each laptop computer or in each alarm system, and to subsequently "activate" only the chips of those customers who enter into a contract.

It is also possible to reuse cards if a customer terminates his contract (for example, if he sells his automobile).

In particular, in the case of the network operator D1, the dealer could release returned cards again for another customer. The network operator therefore eliminates the personalization of cards in the terminal equipment replacement business.

To implement the technical teachings, the GSM chip can advantageously be Toolkit-enabled. In particular, the terminal equipment should be able to transmit short messages to the network operator. The chip should also offer a function to restore the initial state of the chip (see below).

The terminal equipment or a different device may also use this function of the chip. The terminal equipment should also be able to read the card number and the version number (see below). (Alternatively, the card number and the version number could be indicated on the GSM card).

The chip manufacturer is responsible for the pre-personalization. ICCID and IMSI are taken from a pool of numbers, whereas the chip itself derives from a key K1 which is known to the chip manufacturer, an initial key $Ki\_1$. PIN and PUK are set to a default value.

No entry is made into the AC

When a customer is signed up, an entry is made in the AC. This entry is also derived from the initial key $Ki\_1$.

The hotlining flag is set in the HLR

The first call is routed to a security center

The security center negotiates a new $Ki\_2$ as well as a PUK, using the Diffie-Hellman method.

Used chips intended for reuse are reset with an internal function.

Pre-personalization at the chip manufacturer is carried out by allocating a range of card numbers and subscriber identification numbers to each chip manufacturer. The number ranges for ICCID and IMSI are large enough to make this possible. The chip manufacturer also receives the following data from the network operator: a, p, VER, K1.

The chip manufacturer then applies the following data to each chip:

ICCID card number

IMSI subscriber identification number (is tied to ICCID, for example, by having the same position within the two number ranges for ICCID and IMSI)

a a sufficiently large number forming the basis for Diffie-Hellman p a sufficiently large number, prime number for Diffie-Hellman VER a version number, for example 8 bytes, unique for each chip manufacturer (can be changed from time to time)

K1 8 bytes DES key, uniquely tied to VER.

Note: The network operator could derive the key K1 from the version number VER using a master key (for example with the DES method). However, this is not required.

The Chip then Generates the Following Secret Numbers:

$Ki\_1$ $Ki\_1$ is an initial Ki which the chip derives from the IMSI using the DES key K1.

PIN PIN is set to a fixed value of 0000.

PUK PUK is set to a fixed value of 00000000.

Optionally, additional secret numbers.

The chip must retain K1 and the generated secret numbers in a secure region and protect these numbers from being read.

The Processes in the Authentication Center AC:

The AC knows the key K1 of each version number VER (K1 can be derived from VER using a master key so that the values K1 issued to the chip manufacturer do not need to be stored).

The initial values $Ki\_1$ generated by the chips are not recorded in the AC.

Since the AC does not yet know the IMSI's, no static load is produced.

Customer Sign-Up and Release by the Network Operator

A customer who wishes to use his device (his card, his chip), enters into a contract with the network operator. The card number (ICCID) identifies the chip.

The network operator activates the following actions:

Reading or obtaining the card number and version number (ICCID, VER)

The IMSI is permanently associated with the ICCID

IMSI and VER are entered into the AC (it is only now that the subscriber relationship is made known in the AC)

The AC knows the key K1 which is permanently tied to VER and generates from K1 the initial key $Ki\_1$ from the IMSI, using the same method being used in the chip The HLR sets the "hotlining flag" to this IMSI. The first call is then routed to an SC (security center). (The SC could also be the HLR/AC itself)

The First Call: Final Personalization of the Chip

Since the chip and the AC now have knowledge of the same secret key $Ki\_1$, the chip logs on to the network. (The PIN is 0000 and known to the customer)

With hotlining enabled, the first call is automatically routed to the SC. Depending on the software in the Toolkit-enabled terminal equipment, the first call could already be a short message The SC advantageously uses the Toolkit-features of the chip and negotiates with the chip a new secret key $Ki\_2$.

The Diffie-Hellman method is used herein which has the following advantages:

Keys of arbitrary length can be negotiated

It is not sufficient to listen to the air interface to extract the generated key.

The chip stores the new key $Ki\_2$ (this key is subsequently used for authentication).

The new key can be immediately verified (for example, challenge response, as is customary with GSM);

The SC transmits the new key $Ki\_2$ to the AC;

By again using Diffie-Hellman, the SC negotiates a PUK (or additional secret numbers) with the chip. (The network operator can subsequently communicate the secret numbers to the customer or retain the secret numbers for service purposes)

The hotlining flag in the HLR is removed. Normal calls are now enabled, with the new secret key $Ki\_2$ being used from this time on;

The Toolkit-enabled terminal equipment informs the customer about success or failure;

The Toolkit-enabled terminal equipment may aks the customer to select a new PIN.

Reuse of Used Chips/Cards

It will be assumed that the subscriber relationship is removed from the HLR and the AC because the customer has terminated his contract. When a contract is entered with the new customer and a used chip is reused, the following steps are executed:

First, the function of the terminal equipment to initialize the chip is employed.

Thereafter, in the chip:

Ki_2 is deleted

Ki_1 is reactivated

The PIN is set to 0000

The PUK is set to 00000000 (in an analogous manner, with additional secret numbers PUK2)

This function could, for example, be activated within the D1 network by the X13 which is installed at many dealer sites. In this way, the dealer can issue another initialized card.

The additional steps are identical to those for customer sign-up and release by the network operator (see above).

Change of the Secret Key During the Utilization Time of the Chip

The network operator can force a change of Ki in regular intervals. This can be done simply by enabling the hotlining flag in the HLR which routes the call to the SC and, as described above, by negotiating a new Ki. However, the PUK should not be renegotiated at this time.

Possibilities for Misuse (Illustrated here for D1)

1. The key K1 of a chip manufacturer is compromised and a card is copied.

1.1 The IMSI is not yet known in the AC. The card does not register.

1.2 The IMSI of the genuine card is already in the AC and has already been provided with the final personalization.
   The forged card cannot log on since Ki_1 is different from Ki_2 (authentication failed).

1.3 The genuine IMSI is already in the AC, but final personalization has not yet been performed.
   This refers to the brief time interval between the time the contract takes effect and the device is switched on for the first time. During this time interval, a forged card could be "inserted." The genuine card would then not be able to log on because it does not have the Ki_2 of the forged card. This scenario could be prevented, for example, by including—at the time of the subscription—on the order document a secret number which the customer has to provide after receiving the key. This secret number is sent to the SC where it is checked.

2. The customer initializes his own card (for example with X13). Thereafter, the card has the key Ki_1 and does no longer log on.

The invention will now be described with reference to an embodiment illustrated in the drawings. Additional features and advantages are disclosed in the drawings and in the description of the drawings.

BRIEF DESCRIPTION OF THE DRAWINGS

It is shown in.

DETAILED DESCRIPTION OF THE PRESENTLY PREFERRED EMBODIMENTS

Figure 1:
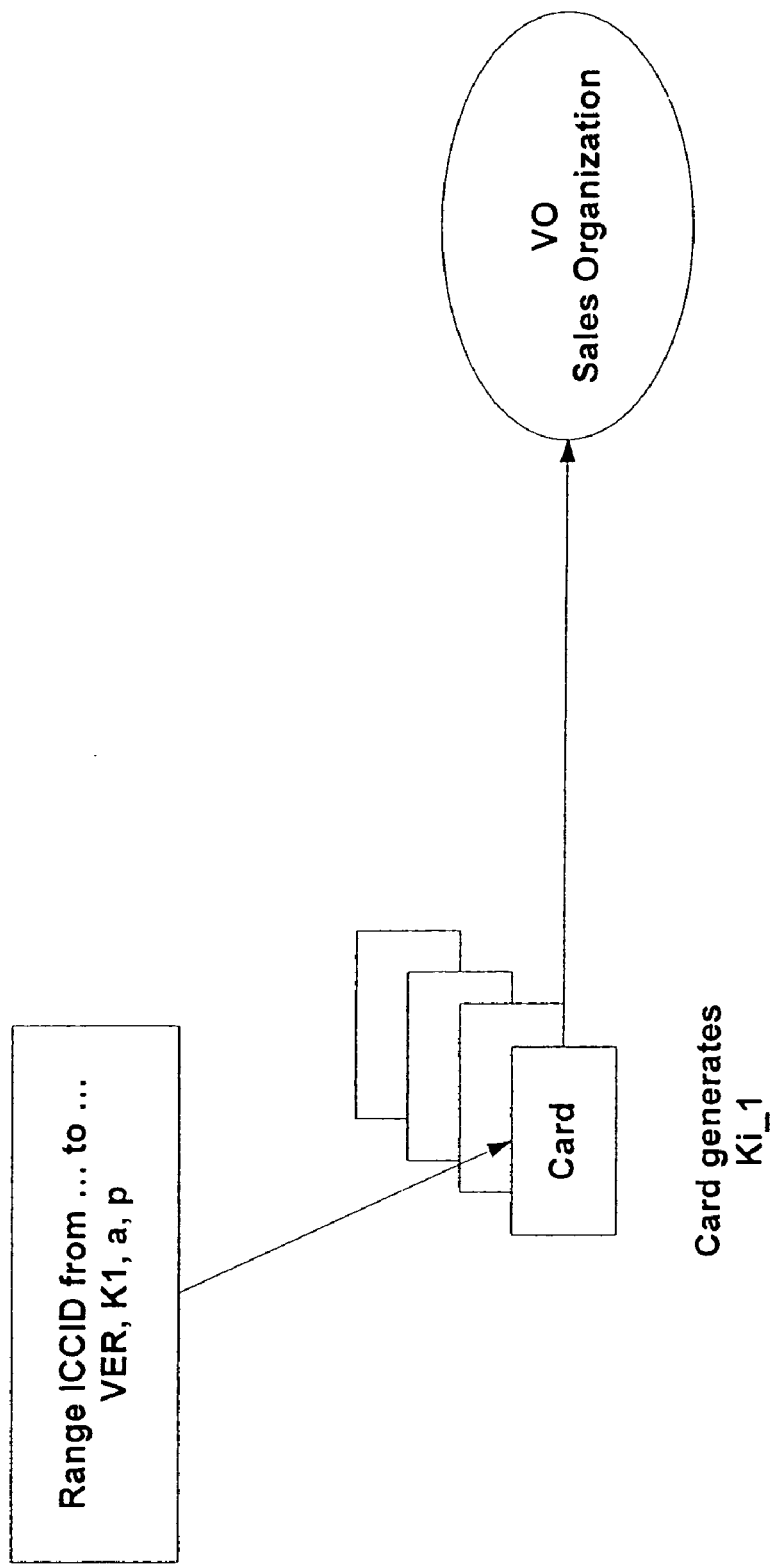
FIG. 1: schematically, the pre-personalization of the cards at the chip manufacturer.

FIG. 1 illustrates in the form of a drawing what has already been described on page 4 of the description, namely that the card number ICCID is provided in a range between a number X and a number Y.

The same applies to the subscriber identification number IMSI which is also located in a range of values between A and B.

In the two number ranges allocated for ICCID and IMSI, a number a is selected as a base for the Diffie-Hellman algorithm as well as a number p which serves as a prime number for the Diffie-Hellman encryption.

Also defined is a number VER which can be a functional number having a length of 8 bytes. In addition, the key X1 is computed in form of a DES key which is tied to VER.

The aforedescribed data are entered into the card, with the chip generating (computing) the secret number Ki_1 which is stored in the card. The card is supplied in this form (pre-personalized) to the VO (sales organization).

Figure 2:
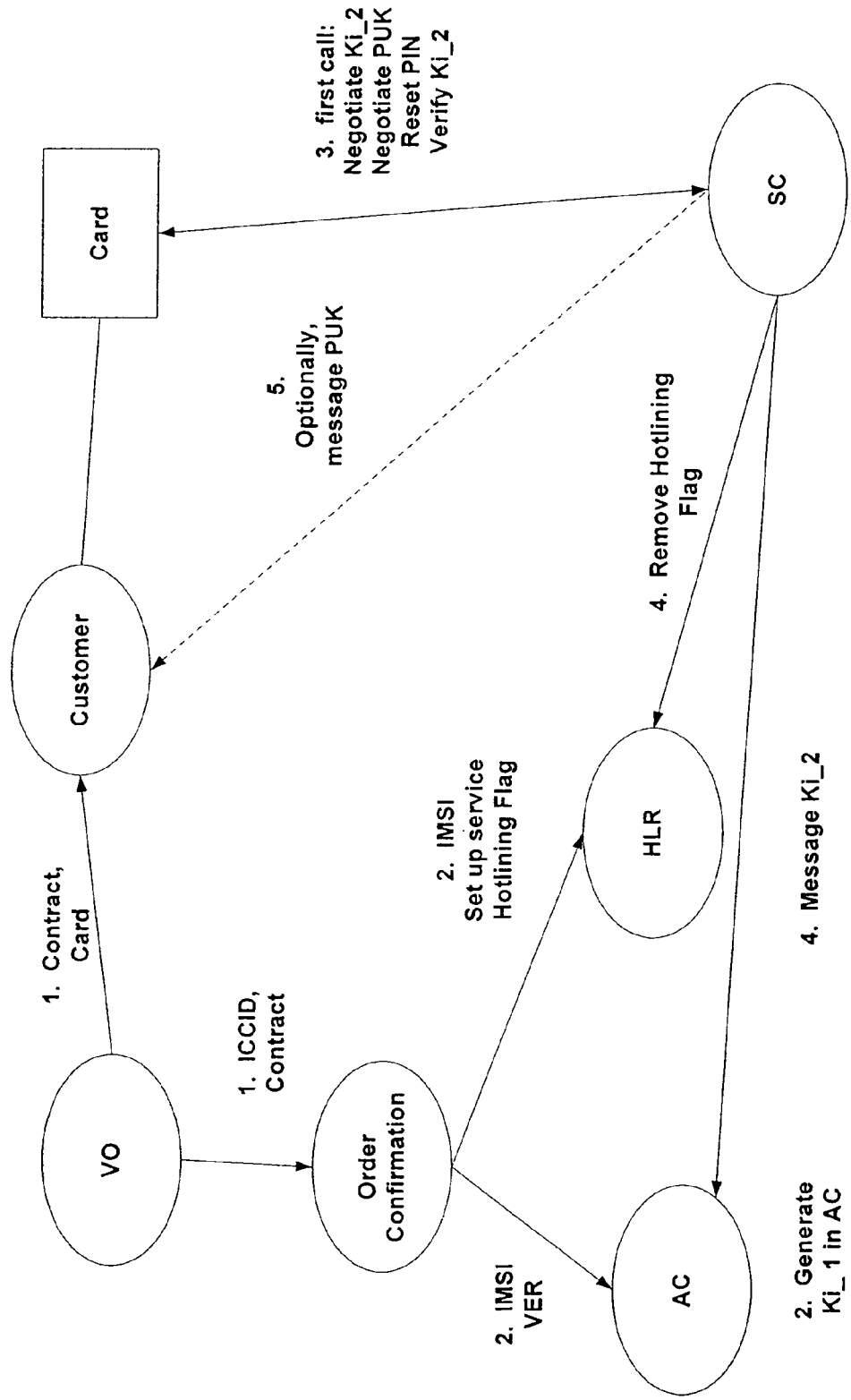
FIG. 2: schematically, the processes during the release by the network operator (final personalization)

FIG. 2 illustrates the individual processes which are described in the description starting on page 5.

In a first process step, the VO enters into a contract with the customer. In the same process step, the card number ICCID and the version number together with the contract are entered in an order confirmation, wherein this order confirmation is communicated in a second process step to the AC together with the subscriber identification number and the version number VER.

At the same time, the subscriber identification number IMSI is communicated to the HLR so that the HLR is made aware of the card data and establishes the so-called hotlining flag.

The customer now receives his pre-personalized card and establishes in a first call—which according to the present invention is forcibly switched to the SC—contact with the SC. In this first call, the Ki_2 is negotiated as well as the PUK, with the new PIN being set at the same time. At the same time, the SC verifies the secret key Ki_2 with respect to the card.

In a fourth method step, the SC contacts the HLR and removes the hotlining flag, which in turn enables the customer to make unrestricted calls.

In the fourth method step, the SC also communicates the secret key Ki_2 to the AC.

At this point, the card is released and provided with the final personalization.

Figure 3:
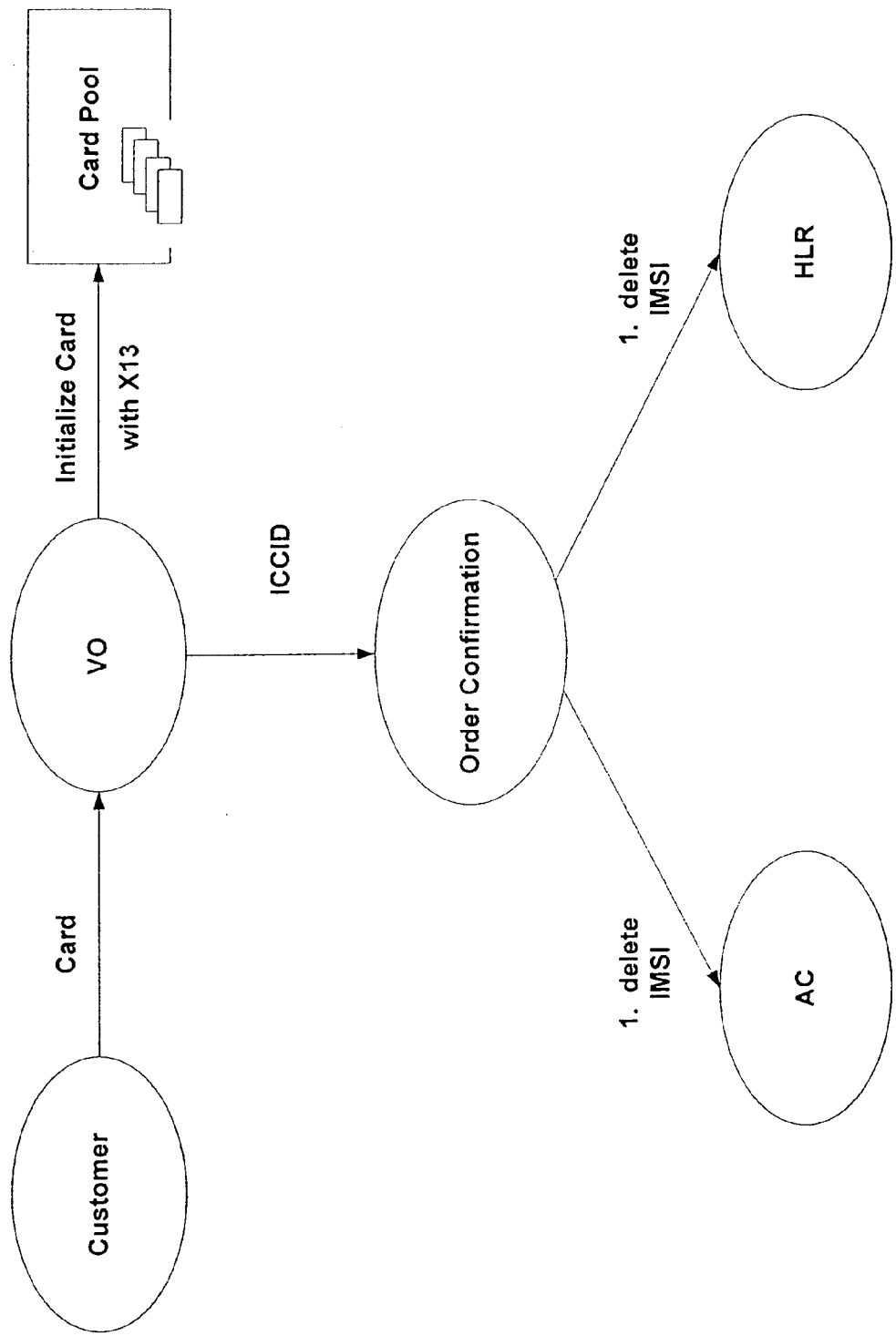
FIG. 3: schematically, the processes when the chip is erased and reused.

The reuse of used cards has been described in detail above. As seen from FIG. 3, the customer contacts with his card the VO which enters the card number ICCID into the order confirmation so that the IMSI is deleted both in the AC and in the HLR.

In this way, the key Ki_2 is deleted and the key Ki_1 is reactivated and stored in the card. Likewise, the PIN is set to the value 0000 and also the PUK.

The card, having been pre-personalized in this way, can now be sent to a card pool and reissued to new customers.

In other words, the final personalization is reversed so that the card is in the same state as when it was pre-personalized.

It should also be noted that the network operator where the order is placed, is also referred to as Order Receiving Office and that this Order Receiving Office has knowledge of the association between ICCID and IMSI due to their 1:1 association within the issued range of numbers.

The invention claimed is:

1. A method for personalizing GSM chips, wherein at the manufacturer for pre-personalizing the chip a subscriber identification number (IMSI), a card number (ICCID) and an additional secret key Ki comprising the steps of:
   a) performing the personalization of the chip when the subscriber logs on to the subscriber network for the first time;
   b) obtaining the (ICCID) card number and the (IMSI) subscriber identification number from a number pool, the chip itself derives an initial secret key Ki_1 from the secret key Ki which is known and entered into the chip, while PIN and PUK are set to a default value;
   c) making an entry in an authentication center (AC) and a home location register (HLR) as soon as the subscriber has entered into a contract with a network operator;
   d) deriving at the authentication center (AC) the initial secret key Ki_1;
   e) setting the conditions of the network so that during logon to the network, a connection is established from the chip to the security center (SC) of the network operator;
   f) routing the connection from the chip to the security center (SC) during the first logon;
   g) negotiating between the chip and the security center (SC) a new second secret key Ki_2 for the chip;
   h) unconditionally disabling the conditions of step e).

2. The method according to claim 1, wherein the initial secret key Ki_1 which is first stored in the chip, is not transmitted to and stored in the authentication center (AC) before the contract is established.

3. The method according to claim 1, further comprising the step of employing a Diffie-Hellman method to negotiate the second secret key Ki_2.

4. The method according to claim 3, wherein the home location register (HLR) is capable of setting and deleting a rerouting command (hotlining flag).

5. The method according to claim 4, wherein, when the initial secret key Ki_1 is entered into the authentication center (AC) for the first time, the hotlining flag is also set in the home location register (HLR).

6. A chip having a memory, wherein at the manufacturer for pre-personalizing the chip a subscriber identification number (IMSI), a card number (ICCID) and an additional secret key Ki are stored, wherein the chip itself derives an initial secret key Ki_1 and, wherein the chip in the terminal equipment is Toolkit-enabled and includes means for communicating with a security center (SC) and negotiating a new secret key Ki_2 for the chip.

7. The chip according to claim 6, wherein the chip includes means for receiving data from the security center (SC) and means for writing the received data to the memory.

8. The chip according to claim 7, wherein the chip comprises a microprocessor for negotiating a secret key with the security center (SC).

9. The chip according to claim 8, wherein the chip includes a dialing number which is fixedly programmed by the manufacturer.

10. The method according to claim 1, wherein PIN and PUK default values are stored at the chip.

11. The method according to claim 1, wherein step g) further comprises negotiating at the security center (SC) the PUK with the chip or generated in the security center (SC) and transmitted to the chip.

12. The chip according to claim 6, wherein PIN and PUK default values are stored at the chip.

13. The chip according to claim 6, wherein the chip includes means for reading data received from the security center (SC) in memory, modifying the data and transmitting the data to the security center (SC).

* * * * *